United States Patent [19]

Goffredo et al.

[11] 4,046,248
[45] * Sept. 6, 1977

[54] CONNECTING AND ALIGNMENT MEANS FOR MODULAR CHEMICAL TREATMENT SYSTEM

[75] Inventors: Daniel L. Goffredo, Riverton, N.J.; Conrad Dale Shakley, Spring Mills, Pa.

[73] Assignee: Chemcut Corporation, State College, Pa.

[*] Notice: The portion of the term of this patent subsequent to Apr. 5, 1994, has been disclaimed.

[21] Appl. No.: 625,172

[22] Filed: Oct. 23, 1975

Related U.S. Application Data

[63] Continuation of Ser. No. 433,490, Jan. 15, 1974, abandoned, which is a continuation of Ser. No. 303,251, Nov. 2, 1972, abandoned, which is a continuation-in-part of Ser. No. 198,622, Nov. 15, 1971, abandoned.

[51] Int. Cl.² ............................................. B65G 15/60
[52] U.S. Cl. ..................................... 198/583; 198/861
[58] Field of Search .................... 198/127 R, 204, 576, 198/583, 780, 860, 861; 52/753 R, 753 C, 753 K, 753 T, 753 E, 753 F, 754, 756, 757, 758 C, 758 D, 758 F, 726; 403/293, 294, 298, 306, 340, 341, 375, 381, 405–408

[56] References Cited

U.S. PATENT DOCUMENTS

| | | | |
|---|---|---|---|
| 444,578 | 1/1891 | Jackson | 403/306 |
| 778,613 | 12/1904 | Ward | 198/127 R |
| 1,970,965 | 8/1934 | Leake | 403/406 |
| 2,031,054 | 2/1936 | McCarthy | 198/204 |
| 3,082,774 | 3/1963 | Benton et al. | 198/127 R |
| 3,119,472 | 1/1964 | McLeod | 52/758 F |
| 3,374,877 | 3/1968 | Kornylak | 198/127 R |
| 3,591,214 | 7/1971 | Gallay | 52/753 E |
| 3,667,589 | 6/1972 | Constable | 198/127 R |
| 3,855,754 | 12/1974 | Scoville et al. | 52/753 C |
| 3,884,002 | 5/1975 | Logie | 52/753 E |

OTHER PUBLICATIONS

Henry Adams, "Joints In Woodwork,".

*Primary Examiner*—Evon C. Blunk
*Assistant Examiner*—Joseph E. Valenza
*Attorney, Agent, or Firm*—Paul & Paul

[57] ABSTRACT

Modular chemical treatment apparatus with improved sidewall connecting and alignment means consisting of a connecting member secured to abutting sidewalls, the connecting member overlying and held in intimate contact with a longitudinal, vertical planar surfce. A variety of such connecting and alignment means are disclosed.

8 Claims, 8 Drawing Figures

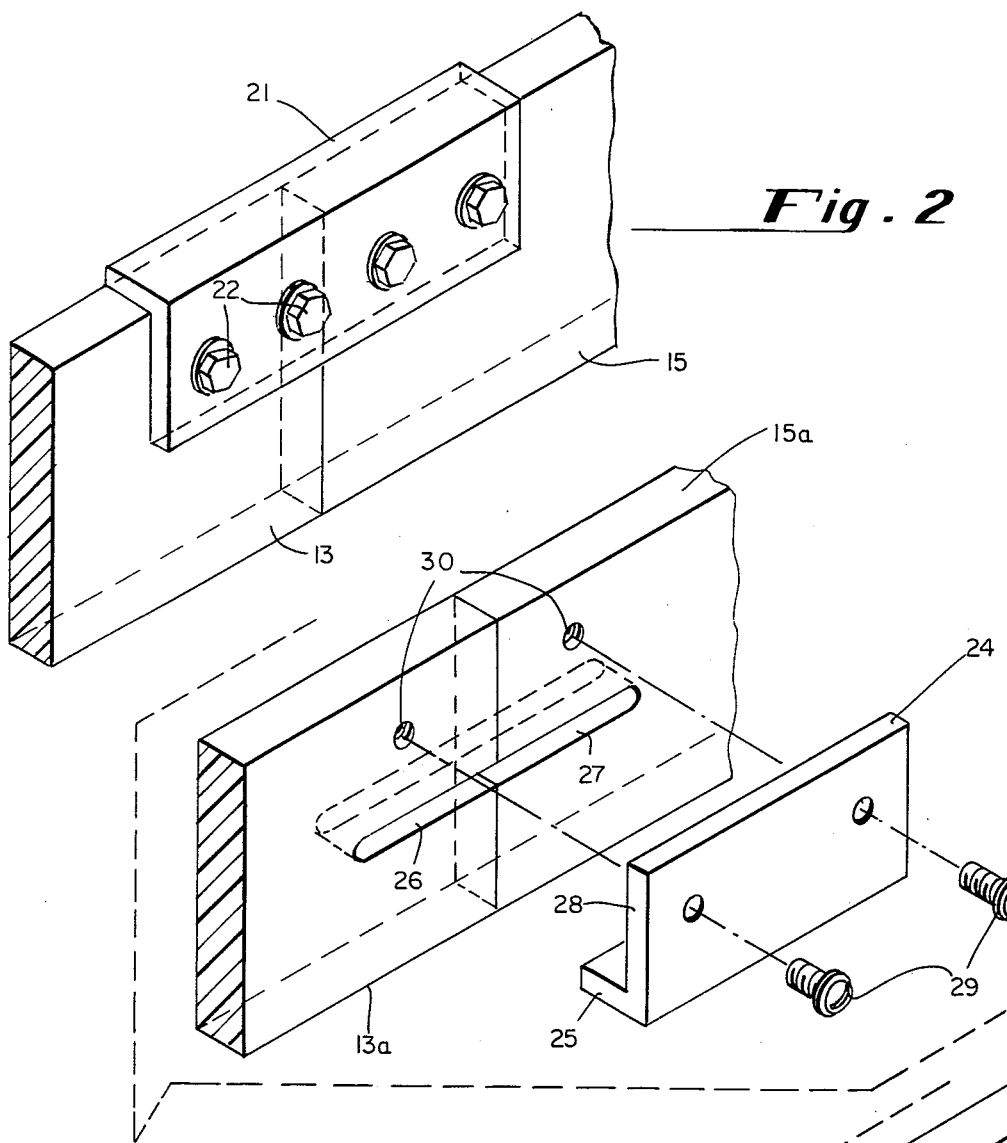

CONNECTING AND ALIGNMENT MEANS FOR MODULAR CHEMICAL TREATMENT SYSTEM

This is a continuation of our co-pending U.S. Pat. Application Ser. No. 433,490, filed Jan. 15, 1974 now abandon, which in turn is a continuation of Application Ser. No. 303,251, filed Nov. 2, 1972, which in turn is a continuation-in-part of U.S. Pat. Application Ser.No. 198,622, filed Nov. 15, 1971 and abandoned in favor of its continuation, U.S. Application Ser. No. 433,482, filed Jan. 15, 1974, now U.S. Pat.No. 4,015,706, the disclosure of which is incorporated herein by reference.

This invention pertains to modular chemical treatment apparatus particulary including improved sidewall connecting and alignment means, and particularly to such apparatus wherein modular sidewalls are securely prevented from both transverse and longitudinal movement, as well as vertical movement and/or canting of one module sidewall with respect to another.

Each type of chemical treatment of various products and manufactured articles, including for example washing, photo resist application, exposure and development, etching, resist removal, painting, passivating, solvent removal and drying, is ordinarily carried out in a separate and specific piece of apparatus designed or modified for the particular job at hand. Multiple treatment steps thus usually require a corresponding number of treatment units. Single units specifically designed for a process including more than one treatment step have been built and used. However, such units may be impractical for conducting any other treatment process even though some of the same treatment steps may be involved. Special arrangements have also been devised wherein several chemical treatment units are combined. In an etching process, for example, in which longer etching time or greater capacity is required, it has been known to serially dispose multiple etching machines in a production line one after another, in order to achieve an extension of their effective chamber length. Each of these approaches to the application of conventional chemical treatment units to chemical treatment processes generally and to multiple step chemical treatment processes specifically is fraught with certain inherent inefficiency, impracticality, or inflexibility which interfers with its more general usage.

The invention of said Application Ser. No. 198,622, filed Nov. 15, 1971, was developed in order to provide a capacity for quickly and efficiency arranging and constructing a chemical treatment system, such as an etching system, on a customized basis, by providing, for example, a desired etching capacity, a desired rinsing capacity, a desired drying capacity, etc., in the provision of modules, that may be combined in units, or in groups, to achieve a desired treatment. The modules are ordinarily aligned and are commonly driven, with means being provided for readily connecting a drive of one module, to the drive of another. It is apparent that the basic invention of our parent application requires connecting means, and one such preferred connecting and alignment means is disclosed and claimed therein. The present invention provides a variety of other connecting and alignment means designs which not only securely prevent all of the undesirable possible relative movements between adjacent modules but which in addition facilitate both connection and detachment of these modules for optimum flexibility in adding or withdrawing particular modular elements from the system.

It is therefore the general object of the present invention to provide simple and efficient sidewall connecting and alignment means for a modular chemical treatment system in which articles are conveyed through numerous treatment areas wherein such articles are exposed to chemicals for any purpose, or are dried, washed, coated, passivated, cleaned, etched, etc.

It is a particular object of this invention to provide a variety of such means which are easily secured to the abutting sidewalls to be connected and also readily detached therefrom so as to facilitate assembly and disassembly of adjacent modules to one another.

Other objects and advantages of the present invention will be readily apparent to those skilled in the art from a reading of the following brief description of the invention, together with the drawings, the detailed description of the invention referring thereto, and the subjoined claims.

Briefly, this invention comprises modular apparatus for chemically treating articles in a conveyor system, wherein the apparatus includes sidewall connecting and alignment means secured to the respective abutting longitudinally extended sidewalls of adjoining modules and maintaining such sidewalls in aligned and assembled relation. This connecting and alignment means generally consists of a connecting member extending between the abutting connected sidewalls and secured thereto in such a way as to overlie and to be held in intimate contact with at least one common longitudinal, vertical planar surface of the abutting sidewalls.

This connecting member may consist of a separate member extending between the abutting sidewalls and connected thereto while mating with or overlying specific surfaces and/or geometric configurations of the abutting sidewalls to prevent the undesirable movement thereof. Additionally, the connecting member may be an extension of the abutting sidewalls, such as reduced width sections which mate together and may include mating depressed and non-depressed areas. Still further, the abutting sidewalls may include protuberances and mating recesses or blind recesses and mating projections which extend into such recesses. Similarly, the abutting sidewalls may include holes for receiving a connecting member which is held by set screws.

All of these various embodiments of the present invention will be described more specifically with relation to the drawings, in which:

FIG. 2 is an enlarged perspective view of the sidewall connecting and alignment means shown in FIG. 1;

FIG. 3 is a perspective view of an alternative sidewall connecting and alignment means in accordance with the present invention;

FIG. 4 is a perspective view of a further alternative connecting and alignment means in accordance with the present invention; employing a protrusion and corresponding recess;

Figure 1:
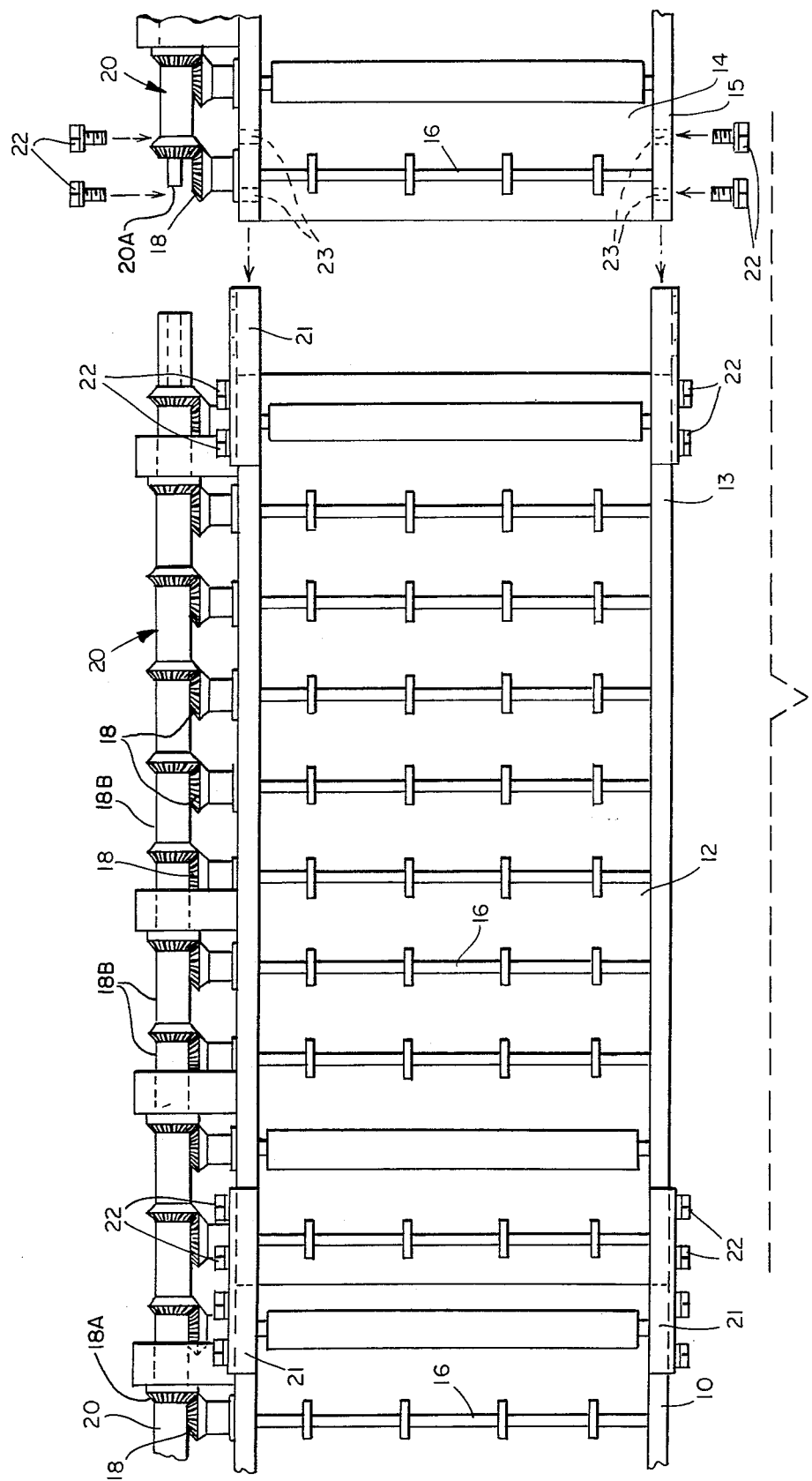
FIG. 1 is a top plan view of several modules in a modular chemical treatment system including one particular sidewall connecting and alignment means in accordance with the present invention.

Referring more specifically to FIG. 1, there is shown a recirculating rinse module 10, and additional rinse modules 12 and 14 (parts of recirculating rinse module 10 and additional rinse module 16 being omitted) of a typical chemical treatment system in which the present invention may be incorporated. All of the modules of such a system, including specifically the illustrated modules 10, 12, and 14 are longitudinally arranged, serially, and each are provided with conveyor members 16 driven by bevel gears 18 engaging mating gears 18A on serially connected segments of drive shaft 20. Each drive shaft 20 includes a drive rod 20A having driven gears 18A mounted thereon for driving of gears 18A by rod 20A, with individual gears 18A in turn, driving driven gears 18. Gear spacer means 18B of gears 18A are disposed between gears 18A, in end-to-end relation over rod 20A, with adjacent said gears 18A being longitudinally spaced from each other by the spacer means 18B, an amount corresponding to the longitudinal spacing of adjacent driven gears 18, as is clear from FIG. 1.

The modular elements shown are most typical of those found in a modular system wherein workpieces are sequentially etched, chemically treated, washed, dried, etc., and the operation of the apparatus illustrated in FIG. 1 will be described with referene to such an etching system. For purposes of this particular patent application, the functions of the individual modules, insofar as they may vary from one to another, and of the modular treatment system generally, are not critical, except insofar as all modules must cooperate to provide a treatment system that is designed to fulfill a particular need. In an etching system, for example, it may be desired, in some instances, to utilize numerous etching chamber modules, while in other instances, only one such module will be required. Obviously, if the system is not an etching system, but is used only for some other treatment process such as cleaning, coating, photographically exposing, etc. (pr any combination of such processes), no etching chamber may be required.

Again, with reference to an etching system in which the rinse modules of FIG. 1 may be incorporated, a fluid reclamation module may be provided and one or both of the additional rinse modules may be omitted or additional rinse modules may be inserted.

These systems generally are operated such that articles to be etched or otherwise treated are placed upon an input conveyor module and delivered therealong, by a suitable conveyor system comprised of rotating transversely disposed rods having rotating wheels mounted thereon, otherwise referred to as conveyor means 16.

Typically, suitable portions of the articles to be treated (etched, for example, if they are printed circuit boards) will have previously been masked, or a "resist" applied thereto, so that only unmasked portions are free to be treated or etched, while masked portions are not etched or treated. In the case of printed circuit boards, the unmasked portions of such articles may be etched by ferric chloride or other suitable etchant directed against the articles by nozzles, jets, or other suitable etchant delivery systems within an etching chamber module as they are conveyed through the module. Such articles are continuously delivered next to an etchant reclamation chamber module wherein jets of air or the like are used to reclaim the etchant for redelivery by any suitable means back to the etching chamber. The articles are then continuously delivered, for example, to a series of rinsing modules, such as those illustrated in FIG. 1, whereby water or other suitable rinsing fluid is applied to the articles to rinse residual etchant therefrom.

The mask or "resist" is removed from the articles by application of a suitable solvent or the like with the articles then being delivered to a drying station module, wherein hot air or the like is utilized to dry the articles for delivery then to an output station or module.

As pointed out above, any number of modules of the type described may be used in sysems of the type of interest with regard to the present invention.

With any particular chemical treatment system, a variety of modules may be utilized as desired. In each case, however, each such module include common connection and alignment means, drive systems, etc. It will be apparent that the conveying system is driven by a suitable electric motor or other motive means connected to the serially connected segments of drive shaft 20. The drive source may be associated with a single module or with a separate power source unit. As shown in FIG. 1 particularly with reference to the assembly of a system including rinse modules 10, 12, and 14, means are provided in accordance with the present invention for connecting the sidewalls of such modules so that the longitudinally displaced modules 12 and 14, and particularly the sidewalls 13 and 15 thereof, are connected and aligned by a particular means which prevents relative movement thereof. This includes connecting member 21 secured to sidewalls 13 and 15 by bolts 22 and mating bolt holes 23 which is better illustrated in the enlarged perspective view of FIG. 2. Obviously other fastening means, such as studs, pins, clips, etc., may be substituted for bolts 22.

Referring more specifically to FIG. 2, there is shown connecting member 21 overlying and held in intimate physical contact with two mutually perpendicular planar surfaces of sidewalls 13 and 15 and bolted thereto with bolts 22. As will be apparent from FIG. 2, connecting member 21 securely holds abutting sidewalls 13 and 15, both connecting and holding them in firm alignment.

In the particular embodiment of the invention shown in FIG. 2, the effectiveness of the connecting and alignment means is enhanced by the fact that connecting member 21 is secured to each of the sidewalls 13 and 15 at a plurality of longitudinally displaced positions.

A similar effect is produced in various ways in each of the other embodiments of the connecting and alignment means of the apparatus of the present invention. In each case, abutting sidewalls are prevented from moving out of alignment with one another or from moving both vertically and transversely and also prevented from becoming canted or angled with respect to one another.

As shown in FIG. 3, another embodiment in which such a secure connecting and alignment means is provided is that in which a connecting member 24 includes a longitudinally extended projection 25 which mates with mating longitudinal recesses 26 and 27 of abutting sidewalls 13a and 15a. A second part of connecting member 24 is planar member 28 which by means of bolts 29 and bolt holes 30, is secured to and held in contact with the common longitudinal vertical surfaces of abutting sidewalls 13a and 15a.

In the embodiment of the invention shown in FIG. 4, rectangularly shaped blind recesses 31 and 32 with bolt holes 33 and 44 therethrough mate in the assembly of abutting sidewalls 13b and 15b, the mating recesses being occupied by connecting member 35 also including mating bolt holes 36 such that upon assembly of abutting sidewalls 13b and 15b, and securing of connecting member 35 to sidewalls 13b and 15b with bolts 37, the engagement of coextensive surfaces of connecting member 35 with the surfaces of blind recesses 31 and 32 provides effective and efficient connecting and alignment means.

Figure 5:
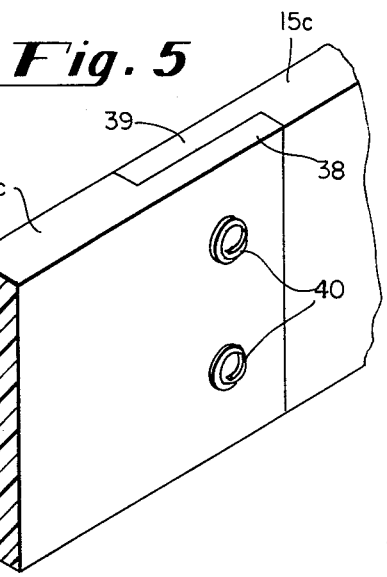
FIG. 5 is a perspective view of another alternative connecting and alignment means in accordance with the present invention.

In still another embodiment of the invention, as illustrated in FIG. 5, sidewalls 13c and 15c are provided with longitudinally extended reduced width sections 38 and 39. Coextensive surfaces of longitudinally extended reduced width sections 38 and 39 are overlaid and secured by bolts, not illustrated, inserted in bolt holes 40 to provide an effective connecting and alignment means, which prevents undersirable movement of the type described in more detail above. In addition, it should be noted that for convenience and appearance purposes, the outer surfaces of longitudinally extended reduced width sections 38 and 39 are co-planar with the outer surfaces of abutting sidewalls 13c and 15c (and of equal total width), such that a continuous sidewall surface is provided.

Figure 6:
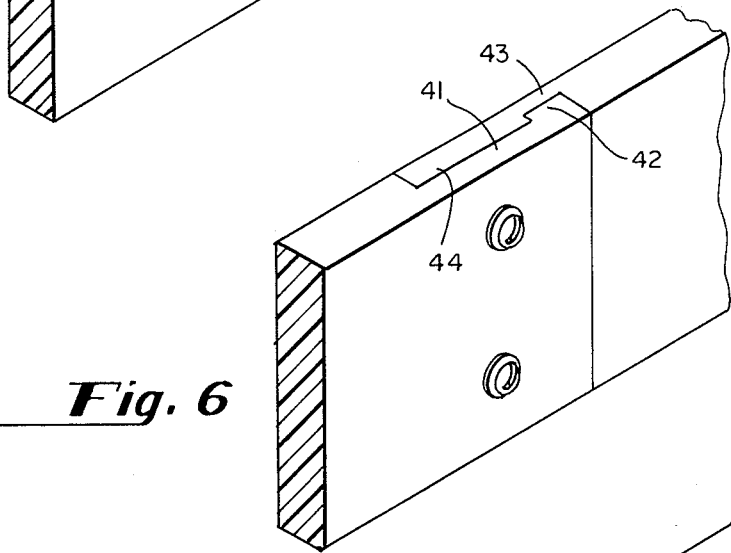
FIG. 6 is a perspective view of another alternative connecting and alignment means in accordance with the present invention, having certain similarities to the embodiment of FIG. 5.

A modification of the embodiment of the connecting and alignment means shown in FIG. 5 is that shown in FIG. 6 wherein the longitudinally extended reduced width sections are provided with depressed portions 41 and non-depressed portions 42 mating with and engaging, respectively, depressed portions 43 and non-depressed portions 44 of the coextensive overlying surfaces of the reduced width sections of the abutting sidewalls. The mating of depressed and non-depressed portions of reduced width sections, as shown in FIG. 6, enhances the resistance of the connecting and alignment means of this invention, as shown in this embodiment of the invention, to resist longitudinal movement of longitudinally adjacent modules and also assists in preventing pitching or canting of the respective modules with respect to one another.

Figure 7:
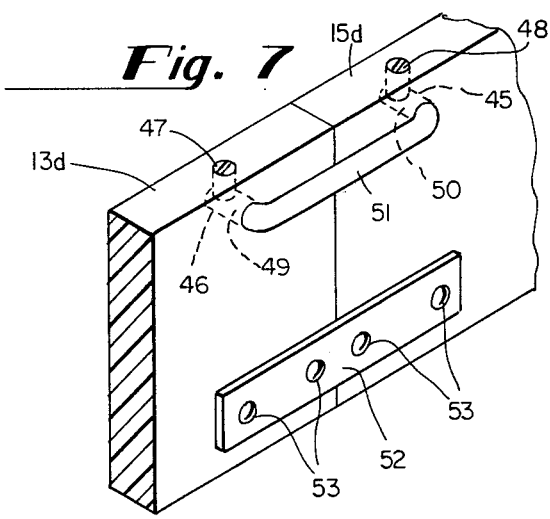
FIG 7 is a perspective view of yet another connecting and alignment means in accordance with the present invention.

Still another embodiment of the connecting and alignment means of the present invention is shown in FIG. 7. In the embodiment of the connecting and alignment means shown in FIG. 7, abutting sidewalls 13d and 15d are provided with holes 45 and 46 and set screws 47 and 48 therein for receiving and holding in place projections 49 and 50 of connecting member 51, the body of which is held in intimate physical contact with the vertical planar surfaces of sidewalls 13d and 15d. Another connecting member 52 is provided to connect abutting sidewalls 13d and 15d with a plurality of longitudinally displaced bolt holes 53 for holding connecting member 52 in intimate physical contact with the connected abutting sidewalls 13d and 15d.

The overall effectiveness of the alignment and connecting means shown in FIG. 7 is enhanced by the fact that connecting members connect the sidewalls at two vertically displaced positions on sidewalls 13d and 15d. This result could equally well be produced by the use of identical connecting means at the top and bottom of sidewalls 13d and 15d rather than the dissimilar connecting means shown.

Figure 8:
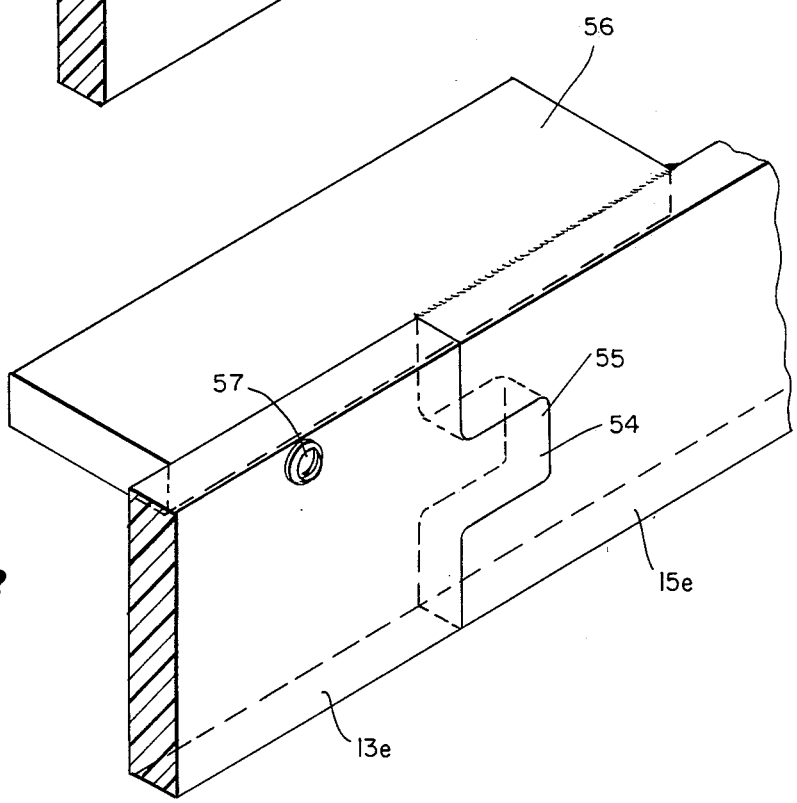
FIG. 8 is a perspective view of a further connecting and alignment means in accordance with the present invention.

Another embodiment of the present invention, as illustrated in FIG. 8, is that in which a sidewall 13e is provided with a longitudinally extended protuberance 54 while abutting sidewall 15e includes a corresponding mating recess 55 for receiving protuberance 54 when sidewalls 13e and 15e are in their abutted, assembled positions. Such a protuberance and corresponding mating recess is combined in this embodiment of the invention with an assembly wherein a connecting member 56, attached along one vertical surface thereof to abutting sidewall 15e (such as by an adhesive or weldment) and overlying a corresponding planar surface of abutting sidewall 13e, is provided with a bolt hole 57 for securing sidewall 13e to connecting member 56.

While this invention has been described with respect to particular embodiments thereof, it will be apparent that various modifications and/or combinations of these embodiments and the elements thereof may be devised by those skilled in the art without departing from the true spirit and scope of the present invention.

We therefore claim as our invention:

1. An apparatus for use in the treatment of articles as part of an overall etching or other chemical treatment operation, said apparatus including a plurality of serially connected modules, each such module comprising a module body having spaced parallel sidewalls, means for conveying articles through the module body and for defining a longitudinal path of movement of articles through the module body, drive means for said conveying means in driving engagement therewith, and sidewall connecting and alignment means carried by at least one end of each of said spaced parallel sidewalls of said module bodies for connection of said spaced, parallel sidewalls of said module to and for transversely aligning said module with the spaced parallel sidewalls of a longitudinally adjacent module, said connecting and alignment means of at least one of said spaced, parallel sidewalls comprising a connecting means carried by a sidewall of said module and by a mating and abutting sidewall of said longitudinally adjacent module, said connecting means comprising at least one planar surface overlying and held in intimate contact with at least a portion of a longitudinal, vertical planar surface of at least one of said longitudinally adjacent sidewalls, by fastening means penetrating at least one of said parallel sidewalls normally to said longitudinally path, wherein said means for conveying articles includes transversely disposed rotatable shaft members with driven gear means carried at one thereof, along one side of said module, and with said drive means including drive gear means carried on drive rod means that extends along said one side of said module, with the drive gear means being in driving engagement with said driven gear means, and with said drive gear means comprising a plurality of individual gears having gear spacer means disposed therebetween and disposed end-to-end over said drive rod means, with adjacent said gears being longitudinally spaced from each other by said gear means an amount corresponding to the longitudinal spacing of adjacent said driven gear means.

2. Apparatus, as recited in claim 1, wherein said connecting means overlies and is held in intimate contact with at least two mutually perpendicular co-planar surfaces of said longitudinally adjacent sidewalls.

3. Apparatus, as recited in claim 1, wherein said longitudinally adjacent sidewalls respectively define longitudinally extended recesses which register with one another when said sidewalls are conneted, and wherein said connecting means includes a part adapted to fit in registry with said mating, longitudinally extended recesses in said longitudinally adjacent sidewalls.

4. Apparatus, as recited in claim 1, wherein one of said abutting end walls includes a longitudinally extended protuberance and the other of said abutting end walls includes a mating recess corresponding in shape and size to said protuberance and adapted to receive said protuberance.

5. Apparatus, as recited in claim 1, wherein said connecting means comprises a longitudinally extended reduced width section of one of said sidewalls and wherein a second connecting means is provided comprising a longitudinally extended reduced width section of a longitudinally adjacent mating and abutting sidewall, said reduced width sections being of equal length, the total width of said reduced width sections equaling that of said sidewalls, and said reduced width sections being adapted to fit together and overlie each other so that the outer surfaces of said overlaid sections are co-planar with the outer surfaces of said longitudinally adjacent sidewalls.

6. Apparatus, as recited in claim 1, wherein said connecting means includes projection means which fit into openings provided for that purpose in each of said abutting sidewalls and are retained therein by screw members.

7. Apparatus, as recited in claim 1, wherein said connecting means comprises a longitudinally extended support bolted to each of said abutting sidewalls at at least two longitudinally displaced points.

8. Apparatus, as recited in claim 1, wherein said connecting means is secured to each of said abutting sidewalls at one vertical position and a second connecting means is secured to each of said abutting sidewalls at a second vertical position.

* * * * *

UNITED STATES PATENT OFFICE
CERTIFICATE OF CORRECTION

Patent No. 4,046,248          Dated September 6, 1977

Inventor(s) Daniel L. Goffredo and Conrad Dale Shakley

It is certified that error appears in the above-identified patent and that said Letters Patent are hereby corrected as shown below:

Column 1, Line 7, after "Ser. No. 303,251" insert --(now abandoned)--;

Column 1, Line 49, "efficiency" should be --efficiently--;

Column 3, Line 44, "pr" should be --or--;

Column 6, Line 46, after "carried at one" insert --end--.

Signed and Sealed this

Thirteenth Day of December 1977

[SEAL]

Attest:

RUTH C. MASON
*Attesting Officer*

LUTRELLE F. PARKER
*Acting Commissioner of Patents and Trademarks*